Nov. 27, 1945.  I. JACOEL  2,389,912
APPARATUS FOR TESTING CABLES AND THE LIKE
Filed Sept. 16, 1944  4 Sheets-Sheet 1

INVENTOR.
Isidore Jacoel
BY
Popp & Popp
ATTORNEYS

Nov. 27, 1945.   I. JACOEL   2,389,912
APPARATUS FOR TESTING CABLES AND THE LIKE
Filed Sept. 16, 1944   4 Sheets-Sheet 2

INVENTOR.
Isidore Jacoel
BY
ATTORNEYS

Patented Nov. 27, 1945

2,389,912

UNITED STATES PATENT OFFICE 2,389,912

APPARATUS FOR TESTING CABLES AND THE LIKE

Isidore Jacoel, Buffalo, N. Y.

Application September 16, 1944, Serial No. 554,432

4 Claims. (Cl. 73—96)

This invention relates to a machine, or apparatus, and method for testing the strength of cables, and the like, and more particularly cables having end loops which surround thimbles or bushings whereby the same are connected to other members.

Cables of this character are used extensively in airplane structure, shipping and hoisting apparatus and as the same are subject to heavy strains it is important that the same be of the requisite strength to carry the load which is likely to be imposed on the same.

It is the object of this invention to provide a machine whereby cables varying extensively in length and diameter may be tested conveniently, economically and quickly in large numbers and thus assure that the same are efficient and satisfactory for the particular purpose for which they are intended.

In the accompanying drawings.

In the following description similar reference characters indicate like parts in the several figues of the drawings.

Figures 1, 13:
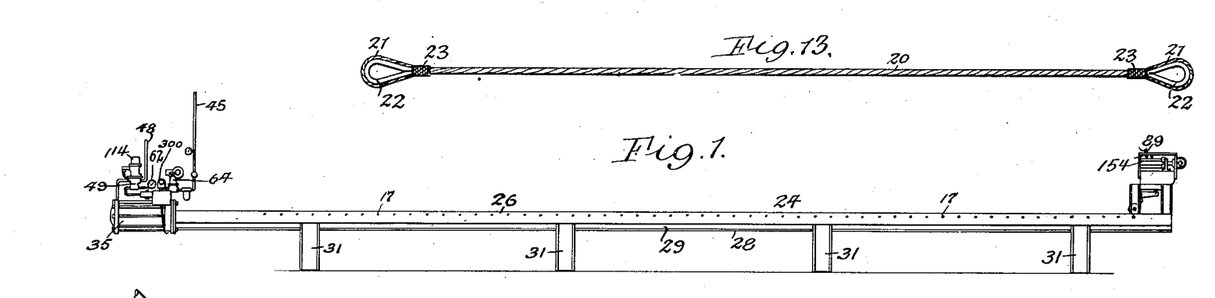
Fig. 1 is a side elevation on a reduced scale of a cable testing machine embodying this invention.
Fig. 13 is a side elevation showing one form of cable which is adapted to be tested in this machine.

Although this machine may be organized for testing cables which are variously constructed the present machine is more particularly designed for testing cables of the type shown in Figs. 1, 5, 7, 9, 10, and 13 and as there shown each of these cables is constructed as follows:

The numeral 20 represents the longitudinal body of a utility cable which is made by helically twisting together a plurality of wire strands in the manner of a rope and providing each end of the same with a loop 21 which surrounds a thimble or eye 22, the end of each loop and the adjacent part of the cable body being interlaced and bound together by a binding cord 23 wound around the same and secured thereto in the manner described in Letters Patent of the United States No. 2,323,774, granted July 6, 1943.

In its preferred construction this testing machine is so organized that the same is first set or calibrated in accordance with the maximum strength which is required of the cables which are to be furnished in accordance with a particular specification and thereafter the desired number of cables are tested for determining whether the same meet these requirements. Whenever cables of a different strength are required the testing machine is reset or recalibrated for establishing another standard in accordance with which the respective cables of different strengths are to be tested.

Figures 2, 12:
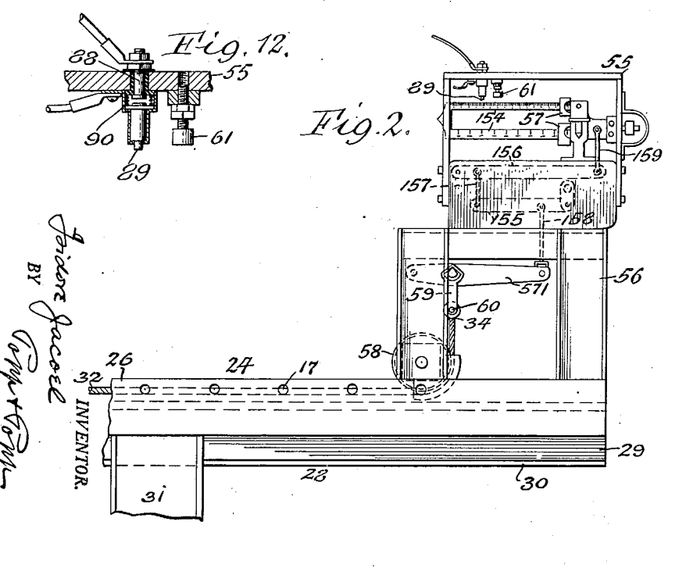
Fig. 2 is a similar view, on a large scale, of the rear part of this machine.
Fig. 12 is a fragmentary vertical section, on an enlarged scale, of the means for limiting the upward movement of the scale beam and an electric circuit which is closed by the movement of this beam.
Figure 3:
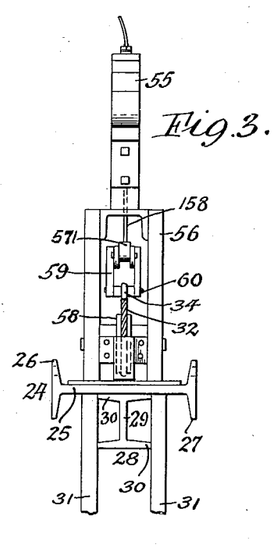
Fig. 3 is a rear end view of the same.

The main frame of the testing machine upon which the various working elements are mounted may be varied but in its preferred construction the same comprises a horizontal longitudinal body 24 having the form of a steel I beam in cross section and arranged with its web 25 in a horizontal position and the upper and lower flanges 26, 27 at opposite edges of the web in a vertical position as best shown in Figs. 1–7. This body is stiffened or reinforced so as to prevent bending or distortion of the same when subjected to strains which draw the front and rear ends of the body lengthwise toward each other, this being preferably accomplished by a reinforcing member having the form of a steel I-bar 28 which is arranged below the web of the body and welded thereto and has its web 29 arranged vertically and the flanges 30 at opposite edges of the respective web arranged horizontally, as best shown in Figs. 1, 2 and 3. This frame body and its reinforcing member are preferably supported at the required height above the floor to suit the convenience of the workmen doing the testing of cables. This is preferably accomplished by providing the frame with a plurality of pairs of upright steel legs 31 secured at suitable intervals by welding to opposite sides of the reinforcing bar 28 and the under side of the body web 25.

Figure 6:
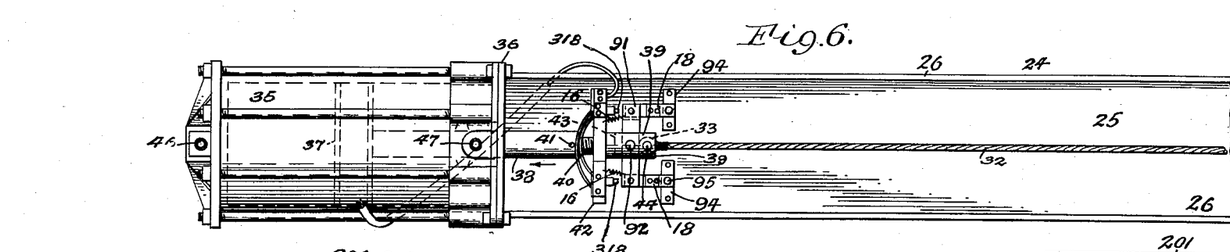
Fig. 6 is a top plan view, partly in section, of the front part of the machine showing the manner of setting or calibrating the same preparatory to testing cables of a required strength.

Before this machine is used for testing cables to determine whether the same comes up to a certain strength requirement the machine is first set or calibrated so that it will indicate and automatically stop its pulling action during subsequent testing operations on cables when the pull on the same has reached the required amount. The means for effecting this preliminary calibration or setting in accordance with this invention also serve mainly as parts of the mechanism whereby the actual testing of cables for strength is effected, and as shown in Figs. 1–6, these means are constructed as follows:

The numeral 32 represents a setting or calibrating cable or gaging line which is subjected to a longitudinal pull as part of the method of setting or calibrating the apparatus. For convenience in attaching this calibrating cable to parts which operate on the same its front and rear ends are provided with attaching eyes 33, 34, as best shown in Figs. 6, 2 and 3. This calibrating cable is placed lengthwise over the body of the frame and its front end is connected with power operated means which exert a forward pull on this cable while the rear end of the same is connected with means which respond to this pull and weigh the amount of the same. The mechanism for effecting the pull on the calibrating cable shown in the drawings preferably includes a pneumatic motor or tractor actuated by compressed air supplied from any suitable source, which motor is preferably constructed as follows:

The numeral 35 represents a power cylinder arranged horizontally and lengthwise at the front end of the machine and having a rear head 36 which is secured to the front end of the frame in any suitable manner. Within this cylinder is arranged a horizontally reciprocating piston 37 which is provided with a horizontal power piston rod 38 projecting rearwardly therefrom through the rear head of the cylinder.

On the rear end of the piston rod is mounted a supporting yoke which is adapted to carry means which aid in attaching the calibrating cable to the piston rod, also means which are employed for attaching the cables to be tested to this piston rod and which also serve as part of the means whereby the pull on the cables being tested causes the pulling operation to be arrested in case one or more of these cables should break during the test. In its preferred form the supporting or coupling yoke includes a central longitudinal hub 39 having a threaded front end 40 whereby the same is connected with the rear end of the piston rod 38, a pin 41 for preventing this hub from turning on the piston rod and a cross piece 42 connected with the front end of the hub and having its opposite ends projecting from opposite sides of the same. The front eye 33 of the calibrating cable is received in a longitudinal slot 43 in the rear end of the hub 39 and securing to the latter by a fastening or coupling pin 44 passing through this eye and the hub, as shown in Fig. 6.

Reciprocation of the power piston 37 in the power cylinder is effected by compressed air supplied from any available source through a supply pipe 45, and alternately delivered to and discharged from the front and rear ends of the power cylinder by means of intermediate branch pipes 46, 47 to a discharge or exhaust pipe 48.

Figure 4:
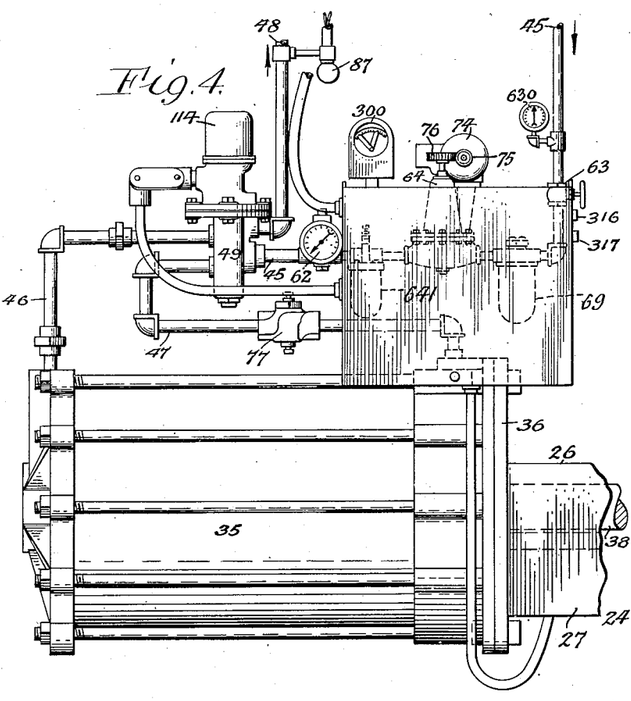
Fig. 4 is a side elevation, on a still larger scale, of the front part of the machine.
Figure 5:
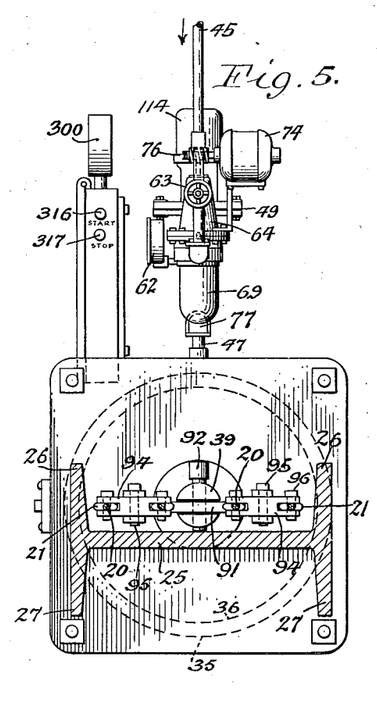
Fig. 5 is a cross section, on an enlarged scale, taken on line 5—5 Fig. 7.
Figures 8, 14, 15, 16, 17:
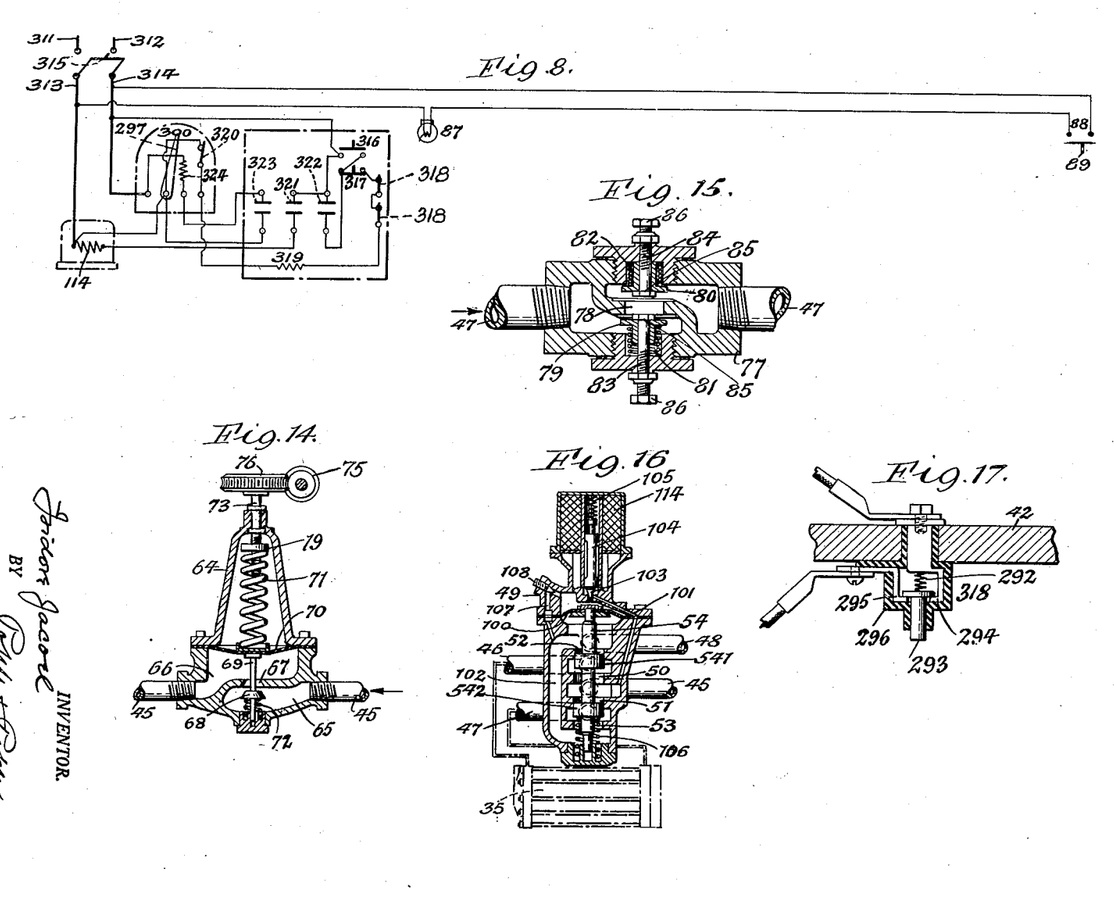
Fig. 8 is a diagram showing the interconnection between the various electrical means of this machine.
Fig. 14 is a sectional elevation of the valve for adjusting the pressure of the air which operates the pulling mechanism in accordance with the standard adopted for the particular cables to be tested.
Fig. 15 is a longitudinal section of a valve device whereby the pressure of the air to and from the pneumatic power cylinder may be regulated for causing the piston therein to reciprocate at the desired speed.
Fig. 16 is a vertical section of an electrically operated valve mechanism for causing air under pressure to be alternately admitted to and exhausted from opposite ends of the power cylinder.
Fig. 17 is a sectional view, on an enlarged scale, of one of the auxiliary or limit switches forming part of the means whereby the testing apparatus is ordinarily stopped in case one of the cables under test should break.
Figure 11:
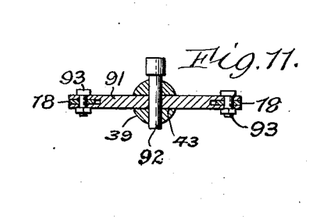
Fig. 11 is a fragmentary cross section taken on line 11 Fig. 7.

The valve means which are employed for accomplishing the last mentioned purpose may be variously constructed, but as shown in Figs. 4 and 16 the same comprise a valve case 49 having ports 50, 51, 52, 53 connected respectively with the compressed air supply pipe 45, front and rear branch pipes 46, 47 and the delivery pipe 48, and a longitudinally movable slide valve 54 which reciprocates vertically in the case and is provided with two reversing gates 541, 542. In the raised position of the slide valve shown in Fig. 16 its upper gate 541 opens the port 50 and closes the port 52 so as to connect the air supply pipe 45 with the branch pipe 46 leading to the front end of the cylinder 35, while the lower gate 542 opens the port 53 and closes the port 51 so as to connect the rear branch pipe 47 with the exhaust pipe 48 by way of passage 102. In the lowered position of this slide valve its upper gate 541 opens the port 52 and closes the port 50 so as to connect the branch pipe 46 at the front end of the cylinder with the exhaust pipe 48 while the lower gate 542 opens the port 51 and closes the port 53 and thus connects the branch pipe 47 at the rear of the cylinder with the air supply pipe 45.

It will be apparent that by alternately raising and lowering the slide valve 54 the piston will be moved by air pressure forwardly and backwardly in the cylinder.

Various means may be employed for actuating the slide valve those shown in Fig. 16, for example, being constructed as follows:

Raising of the reversing valve is effected by a spring 106 bearing against the lower end of the same. The numeral 100 represents a diaphragm arranged within the valve body 49 and engaging the upper end of the valve 54 and adapted to expose its upper side to the pressure of the air supplied by the pipe 45 through a live air by-pass 101 formed in the valve body and leading from the ports 50, 51 to the upper side of the diaphragm, while the underside of the diaphragm is subject to the exhaust of the pipe 48 by a dead air by-pass 102 formed in the valve body 49 and leading from the exhaust ports 52, 53 to the underside of the diaphragm. The live air by-pass 101 is controlled by a needle valve 103 formed on a solenoid core 104 which is adapted to be raised by energizing the coil 114 of a solenoid magnet for opening the by-pass 101 and lowered by gravity aided by a spring 105 for closing this by-pass. When the live air needle valve is open, air under pressure moves the diaphragm 100 and the slide valve 54 down and when the by-pass needle valve 103 is closed the spent air escapes from above the diaphragm through a bleed or relief air passage 101 and the dead air by-pass 102 to the exhaust pipe 48 and the slide valve 54 is raised by the spring 106 in the lower part of the valve body. Escape of the spent air from above the diaphragm may be regulated by a relief regulating valve 108 acting on the bleed or relief passage 107.

The electric circuit containing the coil of the solenoid magnet may be opened and closed in any suitable manner but preferably by the means which will be described later on.

The pull on the cable is preferably measured by means of a scale with which the rear end of the calibrating cable 32 is connected and which may be of any suitable construction but which as shown conventionally in Figs. 1, 2, and 3 includes a vertically oscillating metal beam 154 pivotally mounted in a well known manner on a frame 55 which is supported by a standard 56 on the rear end of the main frame. On this beam one or more scale weights or poises 57 are slidable lengthwise relative to graduations thereon.

On the upper part of the standard 56, a main scale lever 571 is pivoted at one end and its opposite end is operatively connected in any suitable manner with the scale beam 154 so that a pull of the main lever 571 will cause the scale beam to rise.

As shown in Figs. 1, 2 and 3 motion is transmitted from the main lever 571 to the scale beam 154 by lower and upper intermediate levers 155, and 156 pivoted on the frame 55 and connected with each other by a link 157 and respectively with the main lever and scale beam by links 158, 159.

The rear part of the calibrating cable 32 extends rearwardly and upwardly around a guide pulley or roller 58 on the standard 56 and the attaching eye 34 at the upper end of its rear part is detachably connected with the main beam 571 of the scale by means of a clevis 59 the upper end of which is pivotally connected with the main lever 571 while its lower end receives the rear eye 34 of the calibrating cable and is detachably connected therewith by a horizontal pin 60.

The upward movement of the scale beam 154 is arrested at a predetermined place by means of a stop 61 arranged on the upper part of the scale frame in position to be engaged by the beam at the end of its upward movement.

The air pressure which is exerted against the power piston 37 while moving the same forward during the operation of pulling forward on this calibrating cable is indicated on a calibrating pressure gage 62 which is included in the compressed air supply pipe 45 in advance of the air reversing valve mechanism.

Admission of air under high pressure to the supply pipe 45 is controlled by a main shut-off valve 63, which is preferably operated by hand.

For the purpose of reducing the pressure of the air from that which is received from the high pressure source to a lower pressure sufficient to exert a pressure on the calibrating cable which will raise the scale beam 154 in accordance with the setting of the poises 57 and the specified testing stress, a pressure reducing valve mechanism is employed which may be of any suitable construction, that shown in Figs. 4 and 15, as an example, being constructed as follows:

The numeral 64 represents the body of a pressure reducing valve mechanism which has a high pressure inlet 65 and a low pressure outlet 66 connected in series with the supply pipe 45 and a port 67 between said inlet and outlet. The port 67 is provided with a downwardly or rearwardly facing seat toward and from which a reducing valve 68 is adapted to move for varying the size of this port. This valve is operatively connected by a stem 69 with a diaphragm 70 the inner side of which is exposed to the air pressure on the outlet or low pressure side of the port 67. The reducing valve 68 is yieldingly moved toward its open position by a heavy spring 71 bearing against the outer side of the diaphragm 70 and this valve is moved toward its closed position by high pressure air against the inner side of the diaphragm aided by a light balancing spring 72 bearing against the underside of the reducing valve 68. By adjusting the strength of the spring 71 the amount of reduction in the air pressure from the high pressure side to the low pressure side of the reducing valve mechanism may be regulated to suit requirements. This adjustment may be effected by an adjusting shaft 73 turning in a bearing on the valve body 64 and provided on its inner end with a screw thread which works in a screw nut 19 bearing against the outer end of the main spring 71, which screw shaft 73 may either be turned manually at its outer end or by power such as a reversible electric motor 74 provided on its shaft with a worm 75 meshing with a worm wheel 76 on the outer end of the screw shaft 73 as shown in Figs. 4 and 14. The pressure at which the air is supplied from the high pressure source is indicated by a main pressure gage 630 which is connected with the pipe 45. For the purpose of lubricating the interior of the cylinder and the piston of the air motor or tractor, a lubricator 641 of any suitable character is included in the air conduit 45 after the reducing valve mechanism 64, as shown in Fig. 4.

For the purpose of preventing any dirt or other impurities from being carried by the air into this apparatus, a filter 69 is connected in series with the air supply pipe 45 between the main shut-off valve 63 and the reducing valve mechanism.

The branch air pipe 46 connected with the front end of the cylinder 35 is of the same capacity while delivering live air from the supply pipe 45 to this end of the cylinder and when carrying spent or dead air away from the same.

Means are provided in the branch air pipe 47 leading to the rear end of the cylinder so as to restrict the flow of compressed air and cause the piston to move forwardly slowly while pulling on a cable but to move rapidly rearwardly after the pulling operation has been completed.

This is preferably accomplished by a speed control valve mechanism which is shown in Figs. 4 and 15 and constructed as follows:

The numeral 77 represents the body of a speed control valve mechanism which has its opposite ends connected in series with the branch pipe 47 and provided with a port 78 between these ends. Two regulating valves 79, 80 are movable respectively toward and from seats on opposite sides of this port. These valves are yieldingly held in a position nearest to their respective seats by springs 81, 82 and the extent which these valves are permitted to approach these seats and control the opening of the port 78 may be regulated by adjusting stems 83, 84 upon which the speed regulating valves are guided, each of these stems having a threaded connection with the speed valve body, a shoulder 85 at its inner end for limiting the inward movement of the respective speed valve on its stem, and a head 86 at its outer end for turning the same.

In Fig. 15, the parts of the speed control valve are shown in the position which they occupy when live air is being delivered to the rear end of the power cylinder 35 in which case the lower or live air control valve 79 is nearly closed so as to restrict the flow of compressed air to the rear end of this cylinder while the upper or dead air valve 80 is held in a retracted position by its adjusting stem and thus causes the piston 37 to move forwardly in the cylinder and exert a gradual pull on the cable connected with the piston. When, however, the flow of air through the branch pipe 47 is reversed the upper valve 80 still remains in its retracted position but the lower valve 79 is pressed away from the port 78 and allows the spent air to flow freely to the outer atmosphere and the piston to be moved rapidly rearward by the pressure of the live air against the front side of the piston, thereby speeding up the operation of the machine.

By turning the screw stems, 83, 84 the position of the speed regulating valves 79, 80 relative to opposite sides of the port 78 may be so adjusted that the rate of forward and backward movement of the piston can be varied to suit the requirements of different cable testing operations.

*Calibrating operation*

For the purpose of calibrating the apparatus preparatory to testing utility cables the procedure is as follows:

The operator first shifts the poises 57 on the scale beam 154 in accordance with the maximum stress which the cables to be tested are required to stand in accordance with the specified requirements.

The operator now attaches the eyes 33 and 34 at the front and rear ends of the calibrating cable 32 to the hub 39 of the pulling yoke and the clevis 59 of the scale, respectively, and opens the main valve 63. The operator then closes the circuit containing the solenoid coil 114 so that compressed air acting on the upper side of the diaphragm 100 depresses the same and the air reversing valve, whereby compressed air is admitted into the rear end of the cylinder 35 and the calibrating cable 32 is pulled forwardly. While the live compressed air is thus entering the rear end of the power cylinder the operator adjusts the air pressure reducing valve so that the same will only admit air at a sufficiently high pressure or pull on the calibrating cable to raise the scale beam in accordance with the position of scale weights or poises on the scale beam and thus limit the stress which can be placed on this cable to suit the specified requirements.

When this forward pull on the calibrating cable has raised the scale beam so that it engages the stop 61 the operator notes the air pressure which is shown on the calibrating gage or indicator 62 this being the calibrated air pressure required to raise the scale beam in accordance with the weighing position of the poises 57 on the beam by the pull on the calibrating cable. By noting the indication on the gage 62 when the scale beam is raised in accordance with the position of the poises thereon he is informed as to how much air pressure is required to produce a pull on the cables to be tested corresponding to that which was exerted on the calibrating cable.

In case the reducing valve should leak this would be indicated by a drop in pressure on the calibrating gage 62 and thus warn the operator that the reducing valve requires adjustment in order to produce the required air pressure in the power cylinder to put a stress of the specified pressure on the cables to be tested.

When the required stress has been placed on the calibrating cable in accordance with the position of the scale weights or poises on the scale beam the motor reversing valve 49 is raised so that the flow of air is reversed and the rear end of the cylinder is placed in communication with the outer atmosphere and the front end of this cylinder is connected with the compressed air supply whereby the piston 37 is moved rearwardly in the cylinder and the pull on the calibrating cable is arrested and the latter is permitted to relax.

Raising of the air reversing valve is caused by breaking the circuit of the solenoid coil 114 whereby the solenoid core will drop by gravity aided by the spring 105 and close the needle valve 103 so that the spring 106 is permitted to raise the reversing valve into the position shown in Fig. 16. When the diaphragm is raised by the spring 106 air is permitted to escape from the space above the diaphragm to the outer atmosphere through the bleed passage 107.

Owing to the considerable distance between the calibrating pressure gage 62 and the scale beam 154 it is difficult, if not impossible, for the operator while observing the calibrating gage to also carefully observe when the scale beam has been lifted by the pull on the calibrating cable in accordance with the position of the poise on the scale beam for the purpose of informing the operator to stop the forward pull on the calibrating cable when this pull has reached the desired calibrating stress to which the utility cables must conform during subsequent tests of the same.

Various automatic signal means may be employed for this purpose, that shown in Figs. 2, 4 and 8, being suitable for this purpose and constructed as follows:

The numeral 87 represents an electric signal lamp which is arranged near the calibrating pressure gage 62 and connected in series with an electric circuit containing a switch which is opened when the scale beam is lowered and closed when this beam is raised. A suitable form of this switch comprises an upper contact 88 mounted on the scale frame and a lower contact 89 which is yieldingly held out of engagement with the upper contact by a spring 90 and adapted to be raised into engagement with the upper contact by the scale beam.

During the initial part of the forward pull of the power piston on the calibrating cable the scale beam is in its lowered position, the switch contacts 88, 89 are separated and the signal lamp 87 is extinguished.

During the last part of the upward movement of the scale beam the same engages the switch contacts and closes the circuit of the signal lamp 87 whereby the latter is lighted and notifies the operator that the desired stress has been placed on the calibrating cable and at this time the operator notes on the calibrating gage the air pressure which is necessary to produce the specified stress on the calibrating cable. The instant this occurs the air reversing valve is shifted to discontinue the forward pull on the calibrating cable and move the pulling piston backwardly.

Figures 7, 9, 10:
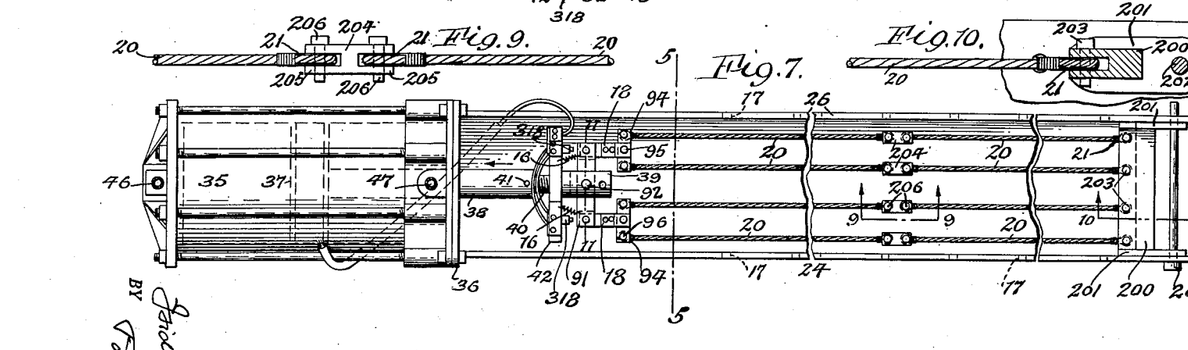
Fig. 7 is a similar view showing the manner of testing a plurality of cables.
Figs. 9 and 10 are fragmentary longitudinal sections taken on the correspondingly numbered lines in Fig. 7.

After the valve 62 has been calibrated in the foregoing manner by means of the calibrating cable the use of the same and the weighing mechanism is discontinued and then the utility cables to be tested are mounted in the machine and operated upon in accordance with the established calibration on the gage 62 by means which are constructed and operated as follows:

The numeral 91 represents a main equalizing bar or lever extending horizontally and transversely through the slot 43 in the hub 39 of the coupling yoke and pivoted with its central part thereto by a vertical pin 92, as shown in Figs. 5, 6, 7, and 11. On opposite sides of the hub 39 are arranged two longitudinal draft links 18 each of which is pivoted by a pin 93 on one end of the main equalizing bar 91. The numeral 94 represents two auxiliary equalizing bars each of which is arranged transversely and pivoted with its central part by a pin 95 on the rear end of one of the draft links 18. Two pairs of utility cables are now placed lengthwise over the front part of the main frame and attached to opposite ends of the auxiliary equalizing levers 18 by passing coupling pins 96 through the opposite ends of the auxiliary equalizing levers and the front thimbles or eyes 33 of the respective utility cables, as shown in Fig. 7.

When only two pairs of utility cables are to be tested at one time the rear ends of these cables are anchored on the frame by means which are preferably constructed as follows:

The numeral 200 represents a thrust head or anchoring device which has the general form of a plate which is adapted to be arranged transversely between the upper longitudinal flanges 26 of the frame body and to be secured thereto by adjusting means which permit this head to be shifted lengthwise on the frame body to suit the number of utility cables which are to be tested in one group or batch. These adjusting means for the thrust head as shown in Figs. 7 and 10 preferably comprise a pair of perforated adjusting lugs 201 projecting rearwardly from opposite ends of the thrust head and an adjusting rod 202 passing through the openings of said lugs and one or another pair of corresponding openings 17 formed in longitudinal rows on the body flanges 26. By removing the adjusting rod 202 from the thrust head and the frame body, the thrust head can be moved lengthwise of the frame the required distance from the power cylinder and piston for testing utility cables of different lengths and also varying numbers of utility cables at the same time.

As shown in Fig. 7 four pairs of utility cables are mounted in the machine for simultaneously testing them for strength in accordance with the maximum requirements established by the showing on the calibrating pressure gage 62. As there shown two front pairs of utility cables are arranged transversely side by side and the attaching eyes or thimbles at the front ends of each pair are detachably connected with the opposite ends of one of the auxiliary equalizing bars 94 by means of the pins 96. In rear of each pair of front utility cables a pair of rear utility cables is arranged in tandem relative thereto and each of these rear utility cables is detachably connected at its rear end with the thrust head 200 by a pin 203 passing through this head and the rear eye or thimble 21 of the respective cable. The opposing ends of each front utility cable and the companion rear utility cable lengthwise in line therewith are coupled with each other by a coupling link or block 204 having forks 205 at its front and rear ends which receive the eyes 21 on the opposing ends of the respective front and rear cables and coupling pins 206 passing through said eyes and forks as shown in Fig. 9.

After a group of utility cables have been thus mounted in the machine the operator causes the reversing air valve to admit live compressed air into the rear end of the power cylinder so that the piston therein is moved forwardly and exerts a forward stress on the several cables which are being tested. The pressure of this test rises until the same reaches the calibrated pressure for which the reducing valve 64 has been set and which is indicated by the calibrating gage 62, thereby limiting the pressure which can be imposed on the cables being tested to this pressure and preventing the same from being strained beyond the specified requirements. This maximum or calibrated testing pressure is maintained for a sufficient length of time to satisfy the operator that all the cables being tested are capable of carrying the calibrated load and the air reversing valve of the power cylinder is again shifted into a position in which the spent air is permitted to escape from the rear end of the power cylinder and live compressed air is delivered into the front end of this cylinder for moving the piston therein rearwardly so as to relax the pull on the cables which are being tested and permit of replacing the same with a new or untested set of cables.

When it is required that the utility cables pass either a higher or a lower pressure test the poises are adjusted accordingly on the scale beam and the pressure reducing valve is adjusted to either increase or reduce the air pressure on the power piston as much as may be necessary to raise the scale beam and thus subject the calibrating cable to the required stress preparatory to testing utility cables in accordance with this calibration.

Means are provided for starting and stopping this testing apparatus at the will of the operator, also clock operated means for automatically timing the duration of the pull which is exerted on the cables under test, and also means for automatically stopping the operation of the apparatus and relaxing the pull on the cables in case any one of the group under test should break, the several means being preferably worked electrically including the solenoid which controls the operation of the air pressure reversing valve. This timing mechanism may be of any suitable and well known construction and is indicated generally at 300 in Figs. 1, 4 and 8.

As shown in Figs. 6, 7 and 8 these electrical control means are preferably constructed as follows:

Referring to Fig. 8, the numerals 311, 312 represent the main lines or wires of the source from which the electric current is supplied for operating this apparatus and which are connected with and disconnected from the main distributing wires 313, 314 forming part of the distributing circuit of this apparatus by a manually operated main control switch 315 of any suitable construction. One side of this distributing circuit is connected with one end of the solenoid coil 114 which operates the air reversing valve of the power cylinder. The numeral 316 represents a normally open main switch which upon being momentarily closed completes the main branch of the current distributing circuit and includes a normally closed main stop switch 317, also two normally closed auxiliary stop switches 318, 318 which are opened by the breaking of one of the cables being tested, also a coil 319 of a holding relay, and also a normally closed timing switch 320, forming part of the mechanism which determines the duration of the pull on the cables being tested. Upon closing the main starting switch 316 the relay coil 319 becomes energized and not only closes an air valve switch 321 included in series with the coil 114 of the air reversing valve but also closes a shunt switch 322 for holding closed that part of the distributing circuit containing the auxiliary stop switches 318, 318 and also closes a timing switch 323 which is included in a branch circuit containing the coil 324 of the motor which operates the timing or clock mechanism after the main starting switch is again closed.

While the relay coil 319 is thus energized and holds the switches 321, 322 and 323 shut the solenoid coil 114 holds the air reversing valve in a position in which air is caused to flow in the rear end of the power cylinder and moves the piston therein forwardly. Normally this forward movement of the piston pulls the cables which are being tested a predetermined length of time in accordance with which the operation of the timing mechanism 300 has been set and when this period has expired a throw-out arm 297 forming part of the clock works of this timing mechanism operates on the timing switch 320 and opens that part of the current distributing circuit which includes the motor coil 324 of this timing mechanism. The instant this occurs the relay coil 319 is deenergized and the relay switches 321, 322, 323 are opened automatically whereby the circuits of which these form parts are broken. As a consequence the air valve solenoid coil 114 is deenergized and the air reversing valve is shifted so as to admit compressed air into the front end of the power cylinder and drive the piston rearwardly and thus relax the pull on the cables being tested. When the power piston is in its rearward position the same is held there by the continued pressure of the air against the front side of the same and while so held the tested cables are removed and replaced by untested cables, preparatory to repeating the cycle of operations just mentioned.

The timing mechanism of which the arm 297 forms a part is so set that this arm moves from its starting position to the switch 320 and opens the latter in accordance with the length of time desired to exert a pulling stress on the cables while testing the same.

After the throw-out arm 297 has opened the switch 320 this arm immediately returns to its starting postion and this switch is closed preparatory to effecting the next testing operation.

If it is desired to stop the power piston at will during its forward movement this can be accomplished by opening the manually operated switch 317 whereby the relay coil 319 will be deenergized and cause the relay switches 321, 322, 323 to open and arrest the operation of the apparatus in the same manner as when the timing switch 320 is opened.

Opening of either the auxiliary stop or limit switches 318, 318 will also stop the forward movement of the power piston and return the same to its rearmost position by breaking the distributing circuit of the various electrically actuated parts which control the operation of this testing apparatus.

Although these limit switches may be variously constructed, each of these switches, as shown in Fig. 17, may consist of an insulating casing 296, two stationary contacts 295, 294 mounted on said casing, a movable contact 293 guided on said casing, and a spring 292 normally holding said contacts in engagement with each other. The contacts of these limit switches form part of the electric circuit which includes the relay coil 319. The casings of these limit switches are mounted on opposite ends of the yoke cross piece 42 so that the movable contacts of the same are arranged in front of the opposite ends of the main equalizing bar 91, as shown in Fig. 7. Normally the latter is yieldingly held in its central position by means of centralizing springs 16 connecting the opposite ends of the main equalizing bar 91 with opposite ends of the cross piece 42 so that neither of the ends of the equalizing bar 91 engages with the movable contacts of these switches. When the cables to be tested are attached to the auxiliary equalizing bars 94 the main equalizing bar or lever is also maintained in its central position and out of engagement with the movable switch contacts 293.

If, during the forward pull of the power piston on the gang of cables which are under test, any one of them should break under the stress to which it is subjected the respective auxiliary equalizing lever or bar will give way and be moved forwardly toward the corresponding end of the main equalizing lever or bar so that the respective end of the main equalizing bar will engage with and move forwardly the adjacent movable limit switch contact 293 and break this part of the electric circuit containing the coil 319 of the holding relay. When this occurs the forward pulling action of the power piston on the cables ceases immediately and this piston is returned to its rearmost position due to the operation of the control mechanism as previously described.

The operator now removes the broken cable and replaces the same by a new one and then resumes the testing operations as before mentioned.

By means of this apparatus large or small quantities of cables and cables of varying lengths and strength requirements can be tested rapidly and accurately thereby effecting a material saving in time and cost for doing such work.

I claim as my invention:

1. An apparatus for testing cables and the like, comprising a relatively stationary head to which the cables to be tested are adapted to be connected, tractor means for pulling on said cables including a pneumatic power cylinder and a piston reciprocable in said cylinder and adapted to be connected with said cables, a reversing valve mechanism for alternately connecting opposite ends of said cylinder with a compressed air supply and an exhaust to the atmosphere, and means for controlling the operation of said reversing valve mechanism including an electric operating device which upon being energized will operate said valve mechanism for causing live air to move said piston in the direction for pulling on the cables being tested, and a clock operated time switch which is arranged in circuit with said electric operating device and which is adapted to automatically break said circuit after a predetermined period and cause said reversing valve mechanism to reverse the flow of live air in said cylinder and move the piston therein for releasing the pull on the cables under test.

2. An apparatus for testing cables and the like, comprising a pneumatic motor having a movable traction member, means for attaching to said traction member cables to be tested including an equalizing lever which normally is at rest relative to said traction member when the cables are intact but which turns relative to said traction member when a cable breaks, an air valve which controls the flow of air for traction purposes to said motor, and electric means for causing said valve to shut off the traction air pressure from said motor when a cable breaks including a solenoid which controls said valve and a switch which is arranged in the circuit of said solenoid and opens said circuit when said equalizing lever turns upon the breaking of a cable.

3. An apparatus for testing cables and the like, comprising a pneumatic motor having a movable traction member, means for attaching to said traction member cables to be tested including a main equalizing lever pivoted centrally on said traction member, links pivoted on opposite ends of said main equalizing lever, two auxiliary equalizing levers each pivoted centrally on one of said links, means for attaching cables to be tested to opposite ends of each auxiliary equalizing lever, a valve controlling the air supply to said motor, and electric means for stopping said traction member including a solenoid which upon being energized causes said valve to admit air to the motor for producing traction on said cables, and two switches included in the circuit of the solenoid and arranged adjacent to opposite ends of said main equalizing lever and adapted to be opened by the latter for deenergizing the solenoid when the main equalizing lever moves into an abnormal position upon the breaking of a cable.

4. An apparatus for testing cables and the like, comprising a pneumatic motor having a movable traction member, means for attaching to said traction member cables to be tested including a main equalizing lever pivoted centrally on said traction member, links pivoted on opposite ends of said main equalizing lever, two auxiliary equalizing levers each pivoted centrally on one of said links, means for attaching cables to be tested to opposite ends of each auxiliary equalizing lever, a valve controlling the air supply to said motor, and electric means for stopping said traction member including a solenoid which upon being energized causes said valve to admit air to the motor for producing traction on said cables, two switches included in the circuit of the solenoid and arranged adjacent to opposite ends of said main equalizing lever and adapted to be opened by the latter for deenergizing the solenoid when the main equalizing lever move into an abnormal position upon the breaking of a cable, and spring means for yieldingly holding said main equalizing lever in its normal position.

ISIDORE JACOEL.